ROLAND J. HAWES, JR.
INVENTOR
BY
BUCKHORN, BLORE, KLARQUIST & SPARKMAN
ATTORNEYS

March 3, 1970  R. J. HAWES, JR  3,498,311
APPARATUS FOR DISPENSING AND DELIVERING FEED ADDITIVES
TO LIVESTOCK AND POULTRY
Filed April 14, 1966  2 Sheets-Sheet 2
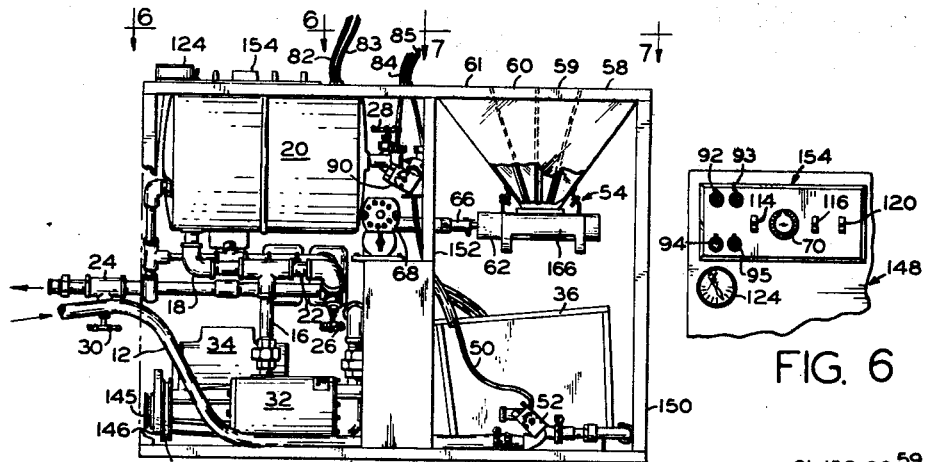
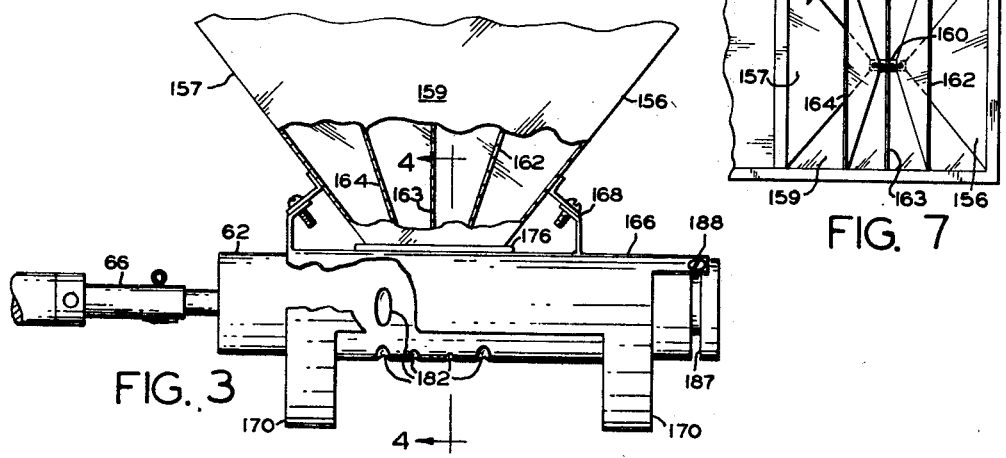
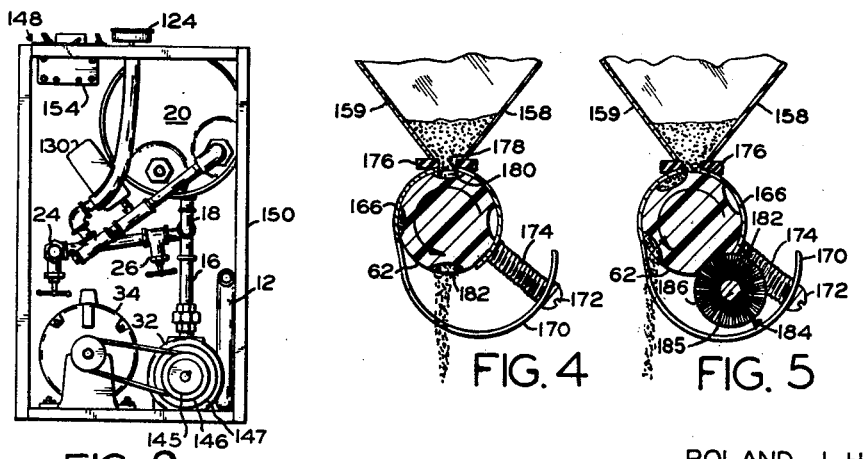
ROLAND J. HAWES, JR.
INVENTOR
BY
BUCKHORN, BLORE, KLARQUIST & SPARKMAN
ATTORNEYS

United States Patent Office 3,498,311
Patented Mar. 3, 1970

3,498,311
APPARATUS FOR DISPENSING AND DELIVERING FEED ADDITIVES TO LIVESTOCK AND POULTRY
Roland J. Hawes, Jr., 10 Mesa Vista Drive, Boise, Idaho 83705
Filed Apr. 14, 1966, Ser. No. 542,521
Int. Cl. G05d 11/02; A01k 5/02; E03c 1/046
U.S. Cl. 137—101.25
11 Claims

ABSTRACT OF THE DISCLOSURE

Apparatus for dispensing and delivering microingredient feed additives to livestock and poultry by metering and dispensing several dry additives and several liquid additives separately, simultaneously and without premixing into a common fluent carrier such as water or molasses, either automatically on demand or selectively.

---

The present invention relates to the feeding of livestock and poultry, and more particularly to an improved apparatus for dispensing additives into a fluent carrier material and for delivering the same to a point of use.

In the prior copending application of Roland J. Hawes, Jr., and Wellington C. Pierce, filed July 15, 1965, Ser. No. 472,207, now abandoned, entitled, "Method and Apparatus for Feeding Livestock and Poultry," there is illustrated and described an apparatus designed for dispensing additives in dry particle form into a liquid carrier such as water and then delivering such water in a demand pressure system to a livestock or poultry watering trough so that the animals consume the additives with the water they drink. The apparatus of such prior application, however, is not capable of dispensing additives in liquid form. Yet many additives are available only in liquid form.

Accordingly, a primary object of the present invention is to provide a new and improved apparatus capable of dispensing feed additives in liquid form.

Another primary object is to provide an apparatus for dispensing both dry and liquid additives at the same time.

A more specific object is to provide an apparatus as aforesaid which is capable of dispensing separately and at the same time several dry additives and several liquid additives into a common carrier material.

The apparatus of the aforementioned application No. 472,207, now abandoned, is suitable only for use with soluble additives because the apparatus is incorporated in a demand pressure system having both a pressure tank and an additive receiving tank in which settleable additives would settle out.

It is therefore another primary object of the present invention to provide a new and improved apparatus for use with both soluble and insoluble additives. To this end the apparatus includes means for providing a continuous flow of a liquid carrier material through an additive receiving section of a supply line and for providing a continuous flow of liquid carrier from such section to the point of use so that settleable additives within the liquid have no opportunity to settle out from the time that they are dispensed into the carrier to the time that the carrier reaches its point of use.

Another object of the invention is to provide an apparatus as aforesaid which is versatile in that it can be used either on a demand pressure basis when handling soluble additives or alternatively on a manually selective basis when handling either soluble or insoluble additives. Apparatus having this versatility is thus suited for use under many different conditions. For example, the apparatus could be connected in an animal drinking water system and used on a demand water pressure basis for supplying livestock or poultry with their daily requirements of additives through their drinking water, or the same apparatus might be used on a manual basis for dispensing additives into a molasses or other liquid carrier which would then be mixed with the animals' normal feed ration.

Still another object of the present invention is to provide apparatus as aforesaid having an improved additive receiving and mixing tank which provides for a rapid and continuous flow of liquid carrier therethrough and which includes means for preventing overflow in the tank and for filtering out solid material of greater than a predetermined size to prevent clogging of the lines between the tank and the point of use.

A further object is to provide an apparatus as aforesaid having an improved storage means for storing several different dry feed additives within a relatively small space.

Another object is to provide a new and improved dispensing means for dispensing several dry feed additives separately but at the same time.

The above and other objects and advantages will become more apparent from the following detailed description which proceeds with reference to the accompanying drawings wherein:

FIG. 2 is a side elevational view of the actual form of apparatus diagramed in FIG. 1;

FIG. 3 is a fragmentary view on an enlarged scale showing the dry additive dispensing portion of the apparatus of FIG. 2;

FIG. 4 is a sectional view on approximately the same scale as FIG. 3 taken along the line 4—4 of FIG. 3;

FIG. 5 is a view similar to FIG. 4 but showing a slightly modified form of the apparatus of FIG. 4;

FIG. 6 is a fragmentary top plan view taken along the line 6—6 of FIG. 2 showing the control panel of the apparatus;

FIG. 7 is a fragmentary top plan view taken along the line 7—7 of FIG. 2 showing the dry additive storage bins of the apparatus; and FIG. 8 is an end elevational view of the apparatus of FIG. 2.

Figure 1:
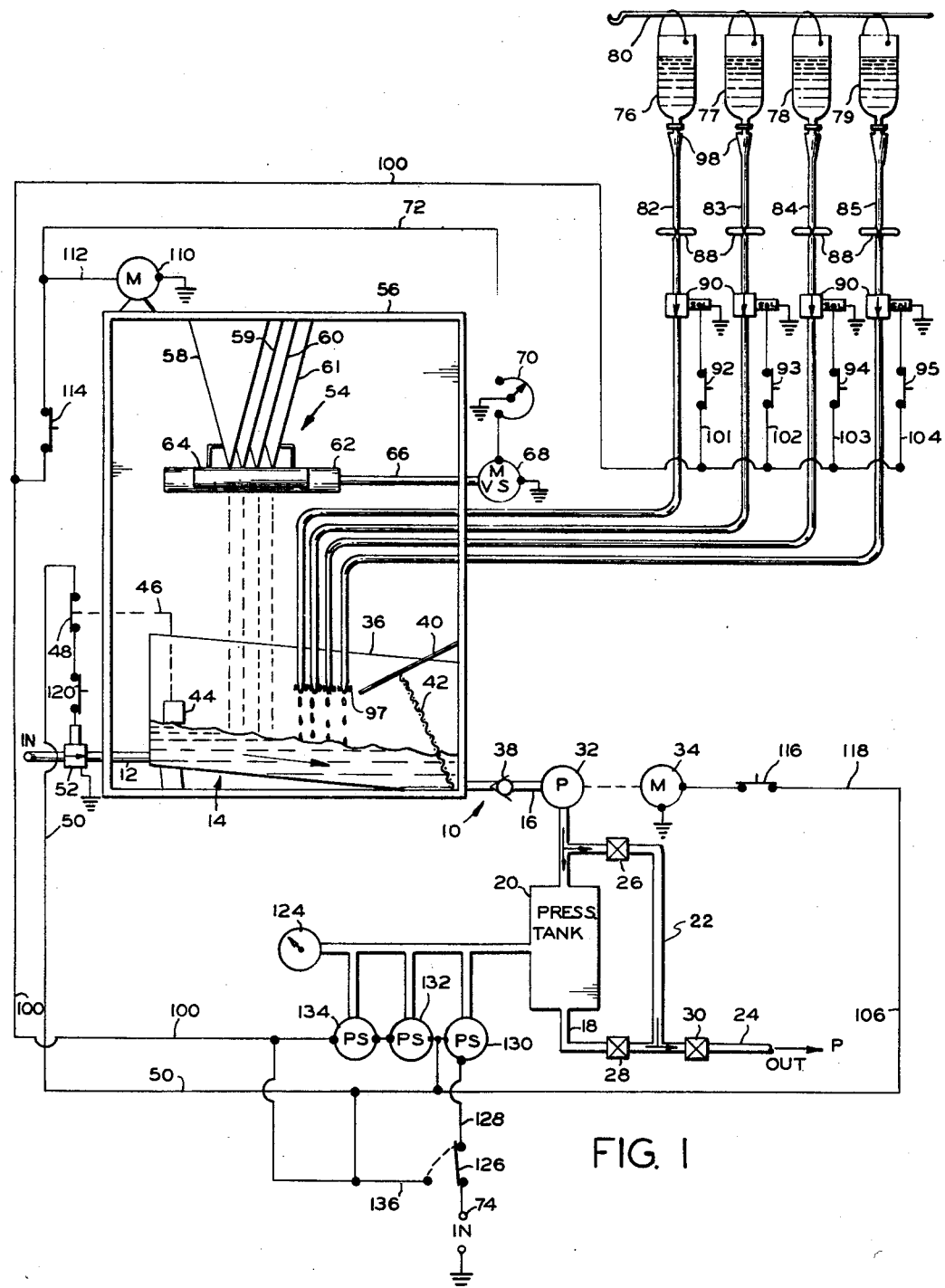
FIG. 1 is a diagrammatic view of an apparatus, including its control system, in accordance with the present invention.

It is to be understood that "liquid additives" and "additives in liquid form" as used herein include both additives in liquid solution and additives in liquid suspension or in liquid slurry form.

With reference first to the diagram of FIG. 1, the apparatus includes a conduit indicated generally at 10 and including an inflow portion 12, an additive receiving section 14, and an outflow portion 16. Outflow portion 16 directs a liquid carrier such as water or molasses from a source under pressure (not shown) to a point of use P which might include a livestock or poultry watering trough, if the liquid carrier were water, or a station at which the carrier is mixed with the livestock feed ration, if the carrier were molasses.

The liquid delivery system downstream from the receiving section includes a pressure line portion 18 which contains a pressure tank 20, and also includes a bypass line portion 22 bypassing the pressure tank and in parallel with pressure line portion 18, but leading to the same discharge line portion 24 as pressure line portion 18. Manual shutoff valves 26 and 28 in lines 22 and 18, respectively, determine the flow through alternatively one or the other of lines 18 and 22. Another manual shutoff valve 30 in discharge portion 24 of the line is capable of shutting off flow through the entire system. A pump 32 driven by an electric motor 34 is provided in outflow line portion 16 upstream from the divergence of such portion into bypass line 22 and pressure line 18 so as to pump liquid either through the pressure line or the bypass line depending on the positioning valves 26 and 28.

The receiving section 14 of the conduit is in the form of an upwardly opening generally rectangular tank 36 which is tilted so as to slope downwardly in the direction of flow through the tank, thereby inducing a continuous flow of liquid therethrough. A check valve 38 in the outlet line 16 leading from the tank prevents backflow into the tank. The tank is also provided with a splashboard 40 which is inclined downwardly from the downstream end of the tank toward the upstream end thereof above the normal level of liquid flowing therethrough to deflect back into the tank any liquid splashing against the downstream end of the tank in the event of high pressure in the inflow section 12 of the line. A filter screen 42 of a predetermined mesh size depending upon the size of the outlet side of the line extends downwardly from the splashboard to the bottom of the tank adjacent the outlet end thereof to prevent abnormally large particles of dry additive or foreign material from entering outlet line 16.

Means are also provided for controlling the upper level of liquid in the receiving tank so as to prevent overflow thereof. Such means includes a float 44 in the tank which is connected by mechanical linkage 46 to an electrical switch 48 in the electrical conductor 50 supplying electrical power to the solenoid of a solenoid actuated valve 52 in inflow line 12. Valve 52 is normally open during operation of the apparatus but is closed to shutoff the flow of liquid into the receiving tank when the float 44 reaches a predetermined upper level in the tank.

A dry additive storage and dispensing means, indicated generally at 54, is mounted vertically above the receiving tank in the same frame 56 that mounts the tank. Such means includes a plurality, in this case four, storage bins 58, 59, 60, and 61 for storing separately four different dry feed additives, and a dispensing rod 62 rotatably mounted by a bearing member 64 beneath botton openings of the storage bins. The rod has a series of openings in its surface (see FIG. 3) which become aligned periodically with the bottom openings in the bins and thus become filled with additive and then dump the additives into the receiving tank upon rotation of the rod about its axis. The dispensing rod is rotated by a drive shaft 66 of a variable speed motor 68. The speed of motor 68 is controlled by a rheostat 70 in electrical conductor 72, which conductor supplies the motor with electrical power from an inlet source of electricity 74.

The details of the dispensing rod, rod mounting means, and storage bins may take the form disclosed in previously mentioned application Ser. No. 472,207. However, what is considered to be an improved dry additive storage and dispensing means is disclosed in detail in FIGS. 2 through 5 and 7, and will be described in detail hereinafter.

The liquid additive dispensing means of the apparatus includes separate liquid additive containers 76, 77, 78 and 79, suspended from a holder 80 at a level well above the level of the receiving tank. Separate supply lines 82, 83, 84 and 85, lead from a bottom opening in each container to discharge ends of the lines terminating within the receiving tank and above the normal level of liquid flowing through such tank. Such lines are also offset from the flow path of dry additives from the dispensing rod into the receiving tank so that dry and liquid additive can be dispensed simultaneously.

Each of the supply lines, or at least a portion thereof, is preferably made of a flexible, resilient material such as a flexible plastic so that the rate of flow of liquid through the lines can be controlled by an adjustable pinch valve 88, on each line. The upper portion of each supply line leads to a solenoid actuated shutoff valve 90, there being a separate such valve for each line and a separate switch 92, 93, 94 and 95 for each valve so that the rate of flow of liquid additive through each line can be controlled independently of the rate of flow through the other lines.

It is also important that restricting means in the form of clamp screws 97 be provided on the discharge end of each supply line so that the outlet opening of the line can be reduced to a size no greater than the remainder of the line. This enables liquid additive to drip from each line at a steady rate for any given setting of pinch valves 88. Each liquid additive storage bottle also has associated therewith means for providing a constant flow rate from the bottle regardless of the level of liquid therein. A suitable combination for this purpose is a standard intravenous injection set including a plastic bottle and constant-pressure air chamber attachment 98 for the neck of the bottle, both being sold, for example, by Cutter Laboratories under the brand name Saftiset.

Electrical power for operating solenoid valves 90 is supplied through an electrical conductor 100 and branches 101, 102, 103, 104 from source 74.

With the foregoing arrangement it will be apparent that several different dry and liquid additives can be dispensed separately but simultaneously into liquid carrier flowing through receiving tank 36, with the rate of dispensing of the dry additives being controlled primarily through the speed of motor 68 and the rate of dispensing of liquid additives being controlled through the individual regulation of pinch valves 88.

Liquid additive supply lines 82, 83, 84 and 85 are maintained separate from one another throughout their full extent if incompatible liquid additives might be dispensed at the same time. However, if it is unlikely that incompatible liquid additives would be used at the same time then the upper portions of each supply line could merge together into a single line, which would then lead to the receiving tank. However, since there will usually be the possibility that an apparatus might be used for incompatible liquids, a preferable arrangement is to have at least two separate supply lines leading to the receiving tank so that incompatible liquid additives will not intermix in concentrated form but only after each is dispensed within the liquid carrier in the receiving tank.

A vibrator motor 110 is mounted on the frame 56 which supports the dry additive bins to facilitate the flow of particles from the bins into the openings in the receiving rod and from the rod openings into the receiving tank. The motor is supplied with electrical power through electrical conductor 112 and line 72 from source 74. A manual shutoff switch 114 is provided in line 72 in a position below line 112 so as to control the supply of electrical power to both vibrator motor 110 and dispenser motor 68.

Another shutoff switch 116 is provided in conductor 118 which supplies electrical power to pump motor 34. Still another shutoff switch 120 is preferably provided in the conductor 50 supplying power to the solenoid valve 52 in inflow line 12.

The apparatus is provided with an automatic control system for use when the apparatus is connected in a demand pressure liquid supply system such as might be provided in conjunction with a livestock watering trough. In this regard, to facilitate the automatic demand pressure operation of the apparatus the pressure tank is provided with a pressure gauge 124. When the apparatus is to be used in a demand pressure system a selector switch 126 in main electrical supply line 128 from source 74 is manipulated to send the current flow through a series of three pressure sensitive switches including a main pressure switch 130, a high pressure shutoff switch 132, and a low pressure safety switch 134, and thence into electrical conductors 50, 100 and 106. However, when the apparatus is to be operated manually so that the liquid carrier flows through bypass conduit 22, a switch 126 is actuated to direct the main current through a bypass conductor 136 which bypasses the pressure switches in supplying electrical current to lines 50, 100 and 106.

FIGS. 2 through 8 illustrate a preferred physical embodiment of the apparatus just described wherein the various components are unitized in a single cabinet 148 with the exception of the liquid additive storage containers which in use must be mounted above the cabinet to effect gravity flow of liquid therefrom. Specifically, the cabinet includes a generally rectangular frame 150 defining a housing which is divided by a vertical partition 152 into two sections, one of which houses the dry additive storage bins and dispensing unit 54 and additive receiving tank 36. The other section houses pressure tank 20, pump 32, pump motor 34, the main, low and high pressure switches 130, 132, and 134, respectively, and the dispenser motor 68 together with most of the liquid carrier lines, including inlet line section 12 and discharge line section 24. Pump 32 has three belt pulleys 145, 146, 147, each of a different diameter, for driving the pump at three different speed ratios with respect to motor 34. For example, the pump might be driven at a 1:1 ratio when handling water, a 1:2 ratio when pumping molasses, or a 1:3 ratio when handling even denser liquids.

The section of the cabinet housing the pump and pressure tank has removable outer sidewalls normally shielding the interior from view, whereas the other section preferably remains open so that the dispensing components and their operation can be readily inspected. The covered section also includes most of the electrical components including a switch panel 154 at the upper surface of the cabinet from which overall operation of the apparatus is controlled. The face of the switch panel, shown in FIG. 6, includes four toggle switches controlling the operation of solenoid valves 90 for the liquid additives, switch 114 controlling dispensing rod motor 68 and vibrator 110, pump motor switch 116, and inlet solenoid valve switch 120. The panel also includes rheostat 70 for regulating the speed of dispensing rod motor 68. Mounted adjacent to the control panel in the upper face of the cabinet is pressure gauge 124 for the pressure tank. The foregoing arrangement provides for convenient operation of the apparatus by a single operator.

Referring now to FIGS. 2, 3 and 7, dry additive storage bins 58, 59, 60 and 61 are of the unique construction which embodies all form bins in a single compact assembly. Such assembly is in the shape of an inverted frustum of a pyramid having four outer sidewalls 156, 157, 158 and 159 sloping inwardly and terminating at their lower ends to form a single elongate rectangular opening 160. The interior of the inverted pyramid thus formed is partitioned vertically into four separate sections which form the bin compartments by three interior walls 162, 163 and 164. The foregoing construction provides a maximum storage capacity in the minimum space provided by the illustrated cabinet. It will be apparent that the interior of the bin assembly can be divided into any number of compartments of various sizes, depending on requirements.

With reference to FIGS. 3 and 4, dry additive dispensing rod 62 is brought into close proximity with the bottom opening in the bin to prevent leakage of additive from the bin by a simplified bearing and sealing construction which includes a semi-cylindrical rod support and bearing shell 166 which extends circumferentially more than 180° about the rod so as to retain the rod within the shell. The shell is joined to opposite sidewalls 156 and 157 of the bin structure by bracket mountings 168. The dispensing rod is urged upwardly against the upper inside surface of shell 166 by a spring-biasing arrangement including a pair of curved arms 170 which extend downwardly at opposite ends of the shell from one corner side edge thereof and then curve beneath the rod and shell and upwardly in spaced relation to the opposite side of the shell. A retainer bolt 172 threaded through the outer end of each arm bears against the lower opposite side of the shell, and a coil compression spring 174 is retained by the bolt between arm 170 and the shell to urge the somewhat resilient shell upwardly against the dispensing rod 62 and thus the dispensing rod upwardly against the upper inside surface of the shell.

An elastomer pad 176 extends between bottom opening 160 of the bin structure and the top surface of shell 166 to form an additive-tight seal at the juncture of the shell and bin. Openings 178 and 180 are provided in the pad and top surface of the shell, respectively, in alignment with the series of openings 182 in the dispensing rod and in register with the openings in the bin compartments. The pad and shell openings are somewhat smaller than the bin openings and are of a size to provide the desired rate of flow of material from each bin compartment into the aligned rod openings. The provistion of resilient pad 176 eliminates the prior need of providing an expensive and rigid one-piece bin and dispensing rod mount and provides for interchange of dispensing rod assemblies or bin units independently of each other.

In the illustrated dispensing rod of FIGS. 3 and 4, there are four rows of rod openings 182 extending circumferentially about the rod with each row being aligned with the bottom opening in a different one of the bin compartments. Thus, as the rod is rotated, each of the several openings in each row will alternately move upwardly to come into register with its aligned bin to be filled with additive and then move downwardly while the material is retained in such opening by shell 166 until the opening clears the shell and moves to a downwardly opening position as shown in FIG. 4 in which the additive material will fall from the opening into the receiving tank. Rod openings 182 have an improved shape in that they are elongate in their direction of rotation and have a concavely curved bottom profile in the direction of elongation, as shown in FIG. 4. This shape gives the openings increased carrying capacity and less of a retaining effect on the additive when in a downward position as compared to round openings with straight sidewalls and a flat bottom wall.

FIG. 5 illustrates a modified dispensing rod assembly which is exactly like that of FIG. 4 with the exception that a brush unit 184, including a rotatably driven shaft 185 and bristles 186 radiating from the shaft, is mounted adjacent the underside of the dispensing rod so that the bristles actually engage the rod surface and enter each rod opening as the openings rotate into the area of the bristles. It will be apparent that the elongate shape and concave bottom walls of the openings uniquely adapt them to be swept clean by the brush when it is rotated so that the bristles move in a direction opposite to that in which the bristle-engaged surface of the rod is moving. Preferably, the brush is driven at a speed several times faster than the dispensing rod in order to achieve the best sweeping action.

The outer end of dispensing rod 62 includes a circumferential slot 187 which receives a guide pin, or screw, 188 extending through an end portion of shell 166 to maintain the rod openings in alignment with their respective bin openings. The illustrated rod shows only four rows of rod openings corresponding to the four bin openings and therefore the rod need not be adjustable lengthwise of the openings and requires only a single slot 186. However the illustrated rod could be replaced with a rod having an adjustable capacity such as shown generally in FIG. 11 of copending application Ser. No. 472,207. Such a rod has several rows of rod openings for each bin, with each row having a different additive dispensing capacity so as to provide adjustable dosages as required.

OPERATION

In operation, and first assuming that the apparatus is to be used to dispense and deliver insoluble liquid or dry feed additives, selector switch 126 is actuated so that the electrical circuit bypasses the pressure switches. Valve 28 in pressure line 18 is closed and valve 26 in bypass line 22 is opened so that the flow of liquid carrier through the system bypasses the pressure tank. Then, with the operator at the control panel and assuming that the liquid additive is to be dispensed from all four bottles 76–79, all of toggle switches 92–95 are actuated to open solenoid valves 90. At the same time switches 114, 116, and 120 are closed to start the pump motor, rod motor and vibrator, and to open inlet valve 52. With the system thus operating water or other liquid carrier would flow from inlet line 12 continuously through the receiving tank 36 where it would pick up both dry and liquid additives metered into the carrier at this point. Thereafter, the additive-bearing carrier liquid flows through the outflow side of the line 16, through bypass line 22 and into discharge line 24, and thence on to its point of use.

To switch the apparatus to automatic demand pressure operation, selector switch 126 is actuated to close the circuit through conductor 128 and through the pressure switches and thereby break the circuit through bypass conductor 136. Valve 26 in bypass conduit 22 is closed and valve 28 in pressure line section 18 is opened to permit flow into and through pressure tank 20. Then with the remaining valves open as before the apparatus would continue to deliver additive bearing liquid through the conduit system to its point of use, such as a livestock watering trough, so long as pressure within tank 20 remained within a predetermined pressure range, as determined by the setting of main pressure sensitive switch 130.

Thus, for example, if discharge line 24 emptied into a livestock watering trough having a float therein opening and closing a float valve in the discharge line, the valve would be closed when the trough were full so as to raise the pressure in tank 20 and thus close inlet valve 52, and valves 90 and shutoff pump motor 32, and dispenser motor 34. However, the float valve would open when the water level in the watering trough lowered, thereby reducing the pressure in tank 20 into the operating range of pressure sensitive switch 130 so as to close a circuit through the switch and thereby open inlet valve 52 and valves 90, and energize the various motors.

Wired in series with main pressure sensitive switch 130 in conductor 100 is a high pressure safety shutoff switch 132 and a low pressure safety shutoff switch 134, which are set at upper and lower pressure limits, respectively, considerably above and below the normal operating range of main pressure switch 130 so as to shut down only the dispenser motor 68, vibrator 110 and solenoid valves 90 and thereby stop dispensing operations in the event that main switch 130 should fail to operate.

Although the illustrated system of FIG. 1 is adapted for handling either soluble or insoluble additives in a pressure demand system, or, alternatively, in a manually actuated system it is to be understood that the apparatus could be designed to operate in only one or the other of such systems. For example, by eliminating bypass line 22 the apparatus would be designed for solely a pressure demand system or, alternatively, by eliminating pressure line section 18, pressure tank 20 and the pertinent pressure switches, the system would be adapted to operate on a manual basis only.

The illustrated apparatus incorporates a conduit system for enabling deposit of the additives into liquid carrier. However the dispensing apparatus could also be used to deposit liquid and dry additives into any fluent material, including dry carriers that might be conveyed by belt or auger in a path beneath the dispensing apparatus.

What is claimed is:

1. Apparatus for dispensing both soluble and insoluble feed additive concentrates for livestock comprising:
   means including conduit means for directing a liquid carrier from a source to a point of use,
   said conduit means including an additive concentrate receiving section for receiving additive concentrates,
   means for providing a continuous flow of liquid carrier through such section,
   dispensing means for dispensing measured quantities of two or more additive concentrates in liquid form into said liquid carrier flowing through said section,
   said dispensing means including separate means for dispensing said two or more liquid additive concentrates separately and simultaneously into said liquid carrier without intermixing before entry into said carrier,
   means for dispensing two or more additive concentrates in dry particle form into said liquid carrier separately, simultaneously and without intermixing with said liquid concentrates before entering said liquid carrier,
   and means providing a continuous flow of said liquid carrier from said section to said point of use during the dispensing operation.

2. Apparatus for dispensing both dry and liquid feed additive concentrates into a fluent carrier material comprising:
   means for conveying said fluent carrier material in a predetermined path, said path including an additive-receiving portion,
   dry additive concentrate storage means positioned above said receiving portion,
   liquid additive concentrate storage means positioned adjacent said receiving portion,
   dry additive concentrate dispensing means positioned beneath said dry additive concentrate storage means and including a rotatable dispensing member,
   said dispensing member being rotatable at a variable speed to vary the rate of dispensing of dry additive concentrate,
   passage means leading from said liquid concentrate storage means to said receiving portion including means for inducing the flow of liquid concentrate from said liquid storage means through said passage means to said receiving portion,
   liquid flow control means for controlling the rate of flow of liquid concentrate from said liquid storage means through said passage means,
   and shutoff means for selectively preventing the dispensing of dry and liquid additive concentrates,
   said dry additive storage means including a plurality of separate additive container means for storing separately different dry feed additive concentrates,
   said liquid additive storage means including a plurality of separate liquid receptacle means for storing separately different liquid additive concentrates,
   said dry additive dispensing means including means for dispensing separately but simultaneously dry additive concentrates from each of said separate container means, said passage means including a plurality of different passages, one leading from each of said liquid receptacle means so as to enable dispensing separately but simultaneously into said receiving portion different liquid feed additive concentrates, and means positioning said dry additive concentrate dispensing means and said passages so as to permit the simultaneous but separate dispensing of both dry and liquid feed additive concentrates into said receiving portion at the same time but without intermingling prior to entry into said fluent carrier material flowing through said receiving portion.

3. Apparatus according to claim 2 wherein said liquid flow control means includes independently operable control means in said separate passages for controlling independently the rate of flow of liquid concentrate through each said passage.

4. Apparatus according to claim 2 including means for providing a constant rate of flow of liquid concentrate through said passage means for a given setting of said control means regardless of the level of liquid in said liquid storage means.

5. Apparatus according to claim 2 wherein said means for selectively shutting off said flow includes solenoid actuated valve means in said passage means and selector switch means for selectively activating said solenoid.

6. Apparatus for dispensing dry and liquid feed additives in either soluble or insoluble form into a liquid carrier and delivering the additive bearing liquid carrier to a point of use either through manual operation or alternatively through automatic operation of the apparatus on a demand pressure basis, said apparatus comprising:

means including conduit means for directing said liquid carrier from a source to said point of use, said conduit means including an upwardly opening additive receiving section, means for providing a continuous flow of said liquid carrier through said section, storage and dispensing means for storing separately and dispensing separately and at the same time measured quantities of a plurality of different dry feed additives and a plurality of different liquid feed additives into said receiving section, a pressure tank in said conduit means downstream from said receiving section, pump means in said conduit means between said receiving section and said pressure tank, bypass passage means bypassing said pressure tank and extending from a point between said pump means and said tank to a point downstream of said tank, pressure-sensitive switch means sensitive to fluid pressure within said tank and operable to activate said pump means within a predetermined tank pressure range, and valve means for controlling the flow of said additive-bearing liquid carrier through either said pressure tank or alternatively through said bypass passage means whereby said apparatus can be operated on either an automatic demand pressure basis for supplying soluble feed additives or on a manually selective basis for supplying insoluble feed additives.

7. Apparatus according to claim 6 wherein said receiving section is inclined downwardly in the direction of flow.

8. Apparatus according to claim 6 wherein said receiving section comprises an upwardly opening tank inclined downwardly in the direction of flow and including a splash-board means inclined downwardly from the downstream end thereof toward the upstream end thereof and a filter screen between the outlet opening of said tank and the point at which dry additives are dispensed into said tank.

9. Apparatus according to claim 8 including a solenoid-actuated shutoff valve in the conduit means upstream from said tank and a float valve actuator means in said tank for closing said valve when the level of liquid within said tank reaches a predetermined upper limit.

10. Apparatus for dispensing materials in dry particle form comprising:

a storage bin having a bottom opening, a cylindrical metering rod extending beneath said opening with the axis of said rod parallel to the plane of said opening, means for rotating said rod about said axis, said rod having a surface recess in alignment with the bottom opening in said bin so that upon rotation of said rod said surface recess will register with said bin opening and thereby become filled with material from said bin, said surface recess being elongate in a direction circumferentially of said rod, a brush rotatably mounted adjacent the undersurface of said rod and including a brush shaft extending parallel to the axis of rotation of said rod and bristles radiating from said rod and into said surface recess, said rod being rotatable in a predetermined direction such that said recess moves downwardly after receiving material from said bin opening to an underside of said rod where said recess is emptied of a substantial portion of said material under the influence of gravity and then upwardly toward said bin opening for refilling, said brush shaft having an axis of rotation offset below said rod in a position such that said bristles extend within said recess during the upward travel of said recess, said brush being rotated in the same direction as said rod so that said bristles move downwardly within said recess to sweep residue of said material therefrom.

11. Apparatus for dispensing two or more feed additive concentrates in liquid form for consumption by livestock comprising:

means including conduit means for directing a liquid carrier along a path from a source to a point of use, said conduit means including an upwardly open liquid additive concentrate-receiving section for receiving said liquid additive concentrates, said receiving section being positioned between said source and said point of use, carrier flow-inducing means for providing a continuous flow of said liquid carrier through said section, dispensing means for dispensing measured quantities of said two or more liquid additive concentrates into said liquid carrier flowing through said section, said dispensing means including at least two separate metering and dispensing means, at least one in communication with a storage means for each different liquid additive concentrate for metering and dispensing said two or more liquid additive concentrates separately and simultaneously into said liquid carrier without intermixing before entry into said carrier, said metering and dispensing means for each said liquid concentrate including means for varying the flow of each said liquid concentrate without varying the flow of the other said liquid concentrates, and electrically operated control means connected to said carrier flow-inducing means and to said metering and dispensing means, said electrically operated control means being operable to control the dispensing of each said liquid concentrate independently of the dispensing of other said liquid concentrates and being operable to control the flow of said liquid carrier through said section.

(References on following page)

References Cited

UNITED STATES PATENTS

| | | |
|---|---|---|
| 740,699 | 10/1903 | Schrader. |
| 857,742 | 6/1907 | Lanquist _____ 222—134 X |
| 1,226,108 | 5/1917 | Olney _____ 222—132 |
| 2,642,837 | 6/1953 | Schroeder _____ 119—52 |
| 2,799,432 | 7/1957 | Suppiger et al. ____ 222—145 X |
| 2,954,145 | 9/1960 | McCauley _____ 222—145 X |
| 3,018,793 | 1/1962 | Aagaard _____ 251—5 X |
| 3,178,066 | 4/1965 | Martin _____ 222—132 X |
| 3,217,694 | 11/1965 | Martin _____ 119—79 |
| 3,233,864 | 2/1966 | Behlen et al. _____ 251—243 |
| 3,245,584 | 4/1966 | Linville _____ 222—132 X |
| 533,252 | 1/1895 | Thomas _____ 222—349 X |
| 2,090,525 | 8/1937 | Carrier et al. _____ 222—288 |
| 2,716,507 | 8/1955 | Graves _____ 137—604 X |
| 2,789,573 | 4/1957 | Glass _____ 137—604 X |
| 2,906,437 | 9/1959 | Wallis _____ 222—349 X |
| 2,969,632 | 1/1961 | Carew et al. _____ 222—288 X |

FOREIGN PATENTS

| | | |
|---|---|---|
| 496,871 | 10/1953 | Canada. |
| 1,313,236 | 11/1962 | France. |
| 582,856 | 10/1958 | Italy. |

WILLIAM F. O'DEA, Primary Examiner

D. J. ZOBKIW, Assistant Examiner

U.S. Cl. X.R.

119—51.11; 137—268, 604; 222—134